March 29, 1960 P. F. THOMPSON 2,930,837
ELECTRICAL TRAILING CABLE
Filed Oct. 17, 1955
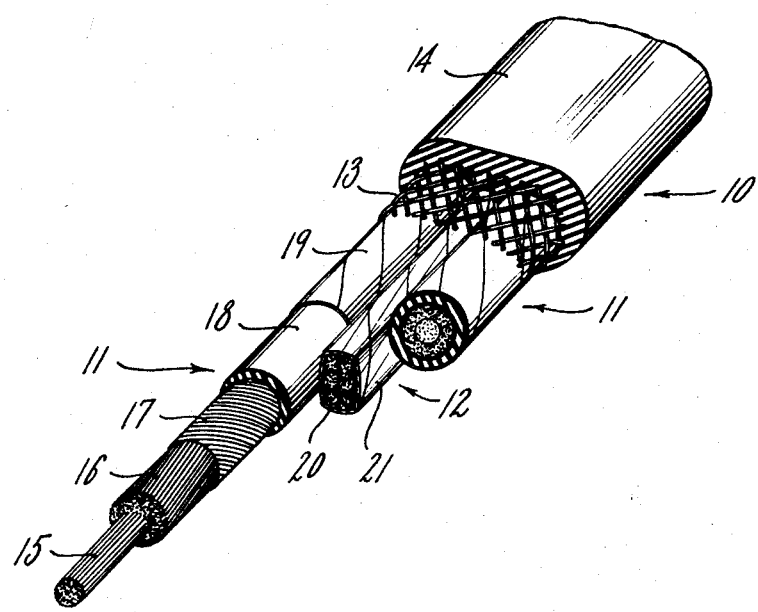
INVENTOR.
PAUL F. THOMPSON
BY
ATTORNEY

2,930,837

ELECTRICAL TRAILING CABLE

Paul F. Thompson, Bristol, R.I., assignor, by mesne assignments, to Kaiser Aluminum & Chemical Corporation, Oakland, Calif., a corporation of Delaware Application October 17, 1955, Serial No. 540,683

2 Claims. (Cl. 174—115)

This invention relates to electrical cables and more particularly to an electrical trailing cable having improved physical properties such as superior resistance to impact, compression, collaring and conductor separation.

The cable comprising the invention is especially well suited for use in supplying power to mobile electric mining machines. Such machines are often equipped with a flexible power cable carried on a reel mounted on the machine, the cable trailing out behind the machine to some point in the rear where it is connected to a permanent electric power line. As the machine advances, the cable passes out from the reel, and when the machinery retreats, the cable is wound back on the reel.

These electrical trailing cables, as those who are familiar with the mining industry know, encounter severe mechanical abuse in service. Cables so used in this type of application must withstand the forces of impact, pinching and compression resulting from heavy mobile equipment loaded with tons of heavy material running over and resting upon such cables. In addition, they must be designed to resist collaring of the outer jacket, destruction of the bond between the jacket and the under assembly, movement of the insulated conductors in respect to their original position, separation of the insulated conductors, as well as twisting and undue flexing thereof.

Accordingly, it is an object of this invention to provide an electrical cable having an improved construction for heavy duty service where severe mechanical and physical conditions, as in coal and iron ore mining, are ever present.

It is a further object of the invention to provide an electrical cable which possesses superior resistance to impact, compression, collaring, flex fatigue, conductor separation, and jacket cutting and tearing, than that possessed by conventional cables presently in use.

Other objects and advantages of the invention will become apparent upon consideration of the following specification and claims when read in conjunction with the accompanying drawing wherein:

The single figure is a perspective view illustrating one type of cable constructed in accordance with the teachings of the invention, some parts of the cable being broken away to illustrate other parts which would not normally be visible.

Referring to the drawing, the cable 10 comprises an assembly of substantially parallel, insulated conductors 11 and a ground conductor 12 positioned therebetween. The assembly is held together by an open fibrous braid covering 13 and enclosed by an insulating jacket 14, which is preferably made of a polychloroprene compound. The braid covering 13 is preferably composed of rayon tire cords for firmly binding the insulated conductors 11 and ground conductor 12 together.

Each of the insulated conductors 11 comprises a fibrous core 15, metallic conductor strands 16, a fibrous serving 17, and a cover of insulating material 18. Wrapped around each of insulated conductors 11 is a fibrous tape 19 which is impregnated and coated with a material having adhesive properties, preferably an insulating material such as polychloroprene which will bond integrally with the polychloroprene jacket 14. The ground conductor 12 comprises a plurality of bunched strands 20 which are covered by a fibrous tape 21 impregnated with a pliable material such as rubber or like insulation.

In assembling the insulated conductors 11, a plurality of fibrous strands are arranged in substantially parallel relationship to form core 15. These strands may be made of rayon tire cord, cotton or any other suitable material. For heavy duty, however, the rayon tire cord is preferred over cotton because of its greater breaking strength. The metallic conductor is formed by winding a plurality of groups of pre-bunched strands 16 spirally around core 15 in such a manner that the individual strands 16 lie in substantially parallel relationship to each other and form one or more substantially complete layers. Strands 16 are preferably made of cadmium bronze wires or tin coated copper wires. A serving 17 of fibrous material such as cotton or the like is wound around metallic strands 16 and the insulated conductor 11 is completed by a cover 18 of insulating material. Although any suitable insulating material could be used and applied in a conventional manner, such as by extrusion, it is prefered that cover 18 be deposited from latex. Cover 18 is preferably made of natural rubber having high insulating properties which is applied over serving 17 by the conventional dipping process and cured in a well known manner.

This particular construction of the insulated conductor 11 has the advantage that the core 15 can deform better under impact, heavy load, twisting or flexure. Under heavy loads or hard impact blows, the core 15 acts as a cushion as the strands 16 are deformed or flattened, and thus minimizes tearing and cutting of the jacket 14, insulating cover 18 or metallic strands 16. The core provides a surface of less frictional resistance than other material such as rubber, and consequently more freedom for the metallic strands 16 to flex about or move under stress. Moreover, the core 15 provides a protective mass capable of allowing the metallic strands 16 to become embedded therein, and it can be used as a reservoir for holding lubricants such as waxes and greases, to further reduce the friction between the metallic strands 16, thereby decreasing their susceptibility to flexing and twisting fatigue.

When tensile stress is applied to the cable 10, the resulting strain normally accepted by the conductors in conventional cables will be initially absorbed by the fibrous core 15 because the metallic conductor strands 16 are longer per linear cord length and capable of withstanding greater elongation without breaking than the core itself. The conductor strands are longer than the core because the former are wrapped around the latter in a spiral, while the strands of the core are substantially straight and parallel. Moreover, the conductor strands are capable of withstanding greater elongation because of the inherently greater elongation of the metal as compared to the fibrous material. If cable 10 is simultaneously subjected to twisting and tensile stress in service, the fibrous core 15 will remain as an effective absorber of resulting stresses and strains because the substantially straight and parallel strands thereof will keep the effective length of the core less than that of the conductor strands 16, regardless of the direction of twist.

The metallic strands 16 being made of cadmium bronze or tin coated copper, are thus protected against mutual contamination between the strands and the compounding chemicals in the cover 18. In addition, strands 16 are laid substantially parallel to each other in order to produce maximum softness and flexibility as compared to a solid metallic conductor or one composed of groups of metallic strands. This parallel alignment of the conductor strands 16 as well as the relatively long lay thereof (greater than ¾ inch) results in a smaller conductor diameter, thus permitting greater volume of the fibrous core 15, or greater thickness of insulating cover 18 or jacket 14.

The serving 17 provides protection for metallic strands 16 against direct contact with the insulating cover 18 and permits the metallic conductor strands 16 to move freely when the cable 10 is subjected to twisting and bending. In allowing conductor strands 16 to slide within the serving 17, kinking of the strands and breaking of the bond between the tape 19 over insulated conductors 11 and jacket 14 is minimized.

An advantage of using an insulating cover such as 18, which is deposited from latex, is that the total thickness required for adequate insulation of conductors 11 is much less than that necessary in the usual trailing cables employing other types of insulating material, such as extruded rubber. In actual tests, it has been found that by using an insulating cover such as 18, the total thickness of insulation required for conductor 11 is approximately one-half that required when conventional extruded rubber is used. Accordingly, even though the overall outer diameter of metallic strands 16 may be increased by core 15 to a size greater than that of a conventional metal conductor, the relatively thin insulating cover 18 permits manufacture of cable 10 with the same or smaller outside dimensions than cables of conventional design. At the same time, the improved design is much more flexible and durable.

After the insulated conductors 11 have been built-up and the insulating cover 18 cured, each conductor is wrapped with tape 19. This tape is made of woven fabric which is impregnated and coated on its outer surface with a material which has adhesive properties. It is preferred that an insulating, rubber-like material be used and that this material be the same as that used in jacket 14. In the particular embodiment illustrated, polychloroprene is used both for the tape 19 and jacket 14. With such construction the tape 19 and jacket 14 become integrally bonded to each other on curing for preventing the jacket from being pulled back over insulated conductors 11, a condition commonly referred to as "collaring." This condition is undesirable because the insulated conductors 11 can easily become separated, crossed and kinked, and are less protected against impacts which can break the insulating cover 18. As a consequence, the danger of short circuits resulting in serious injury to personnel and property is greatly increased.

The ground conductor 12 comprising the bunched metallic strands 20, is likewise wrapped with tape 21. However, tape 21 is employed for an entirely different purpose than tape 19. Tape 21 comprises a woven fabric impregnated with a suitable, pliable material and in the particular embodiment illustrated, GR–S type, synthetic rubber insulation is used. The tape is spirally wrapped around bunched strands 20, which may be made of wires similar to those used for the insulated conductors 11. The rubber or rubber-like material in tape 21 will frictionally engage tape 19 to hold the ground conductor 12 in proper position as it is assembled with insulated conductors 11. However, the material in tape 21, unlike that in tape 19, is a non-adhesive and therefore will not bond to the latter during vulcanization of jacket 14, for a purpose to be described below.

An advantage of using tape 21 over ground conductor 12 is that the metallic strands 20 will not be excessively scored as the ground conductor 12 is flattened between two steel rolls during its assembly with the insulated conductors. Tape 21 also protects against any of strands 20, which might possibly be broken under flexing stresses, from penetrating into the insulated conductors 11 to cause a short circuit. In addition, tape 21 provides a surface of less frictional resistance than would a layer of rubber insulation alone, for freer movement of the metallic strands 20 of ground conductor 12 when subjected to bending and twisting action, and the tape prevents the compound of jacket 14 from being forced into and subsequently restricting the movement of the ground conductor 12. Since tape 21 does not bond to tapes 19 or jacket 14, ground conductor 12 will be able to shift slightly relative to the insulated conductors 11 and jacket 14 as the cable is flexed, thereby prolonging the flex fatigue life thereof.

After the ground conductor 12 is flattened and assembled between the insulated conductors 11, the assembly is passed through a braiding machine which applies the open braid covering 13. Although covering 13 could be made of any suitable fibrous material, rayon tire cord is preferred because of its high strength which enables the braid 13 to hold the assembly together and maintain the insulated conductors 11 and ground conductors 12 in substantially parallel relationship with each other as the jacket 14 is applied. Moreover, after the jacket 14 has been applied, braid 13 functions to keep the aforesaid conductors in proper assembled relationship. For example, should jacket 14 be cut, ripped or torn open, braid 13 will prevent insulated conductors 11 from separating, or crossing over each other to avoid the possibility of short circuits.

Jacket 14 is extruded over the braided assembly and then vulcanized in a well known manner. As stated previously, jacket 14 is preferably made of polychloroprene which not only has increased resistance to light, oil and ozone, but is tough and durable as well. This compound is thus especially suitable as jacketing material which is subject to the frequent impacts and heavy loads encountered in mining operations. By curing both jacket 14 and tape 19 together, an integral bond is obtained therebetween. This bond anchors the taped, insulated conductors 11 in a fixed parallel position with respect to jacket 14 and thus prevents the insulated conductors 11 from separating and crossing over each other, and the jacket 14 from collaring or tearing. The braid 13, which becomes embedded in jacket 14, also aids in anchoring the jacket to the assembly and in maintaining the insulated conductors 11 and ground conductor 12 in substantially parallel relationship with each other.

It is to be noted that the use of tape 19 provides an outer surface of polychloroprene which becomes integrally bonded to polychloroprene jacket 14 as they are cured together, and thus forms a stronger bond therebetween than could be obtained by attempting to bond the pre-cured, latex cover 18 directly to the polychloroprene jacket 14. At the same time, the inner surface of tape 19 does not bond to the pre-cured insulating cover 18 as the former is cured, and thus permits free stripping of the insulation 18 when preparing the cable 10 for connection to electric terminals. Nevertheless, there will be little or no slippage between tape 19 and cover 18 when assembled, because the spiral wrapping of the tape is maintained tight enough around insulated conductors 11 by the bond between the tape 19 and jacket 14.

As will now be apparent, the cable comprising the invention represents a substantial improvement over those currently employed for the same, or similar purposes. It has been determined through numerous tests that the improved cable possesses much greater resistance to failure caused by impact, compression, separation of the insulated conductors, breakage of the bond between the jacket and the insulated conductors, and jacket cutting and tearing, than the resistance of conventional cables. For example, in comparing seven conventional cables of different make with a cable constructed in accordance with the invention, each of AWG size 4, and having two insulated conductors and a ground conductor, the following results were obtained. In jacket resistance to tearing, the inventive cable exhibited an increase of 13.5% over the best performing conventional cable and an increase of 163.5% over the average of the seven conventional cables. In resistance to breakage of the bond between the jacket and the insulated conductors, the inventive cable showed an increase of 56.5% over the best and an increase of 177.5% over the average. In resistance to impact failure, the inventive cable exhibited an increase of 37% over the best and an increase of 203% over the average. In jacket and insulation resistance to cutting, these components of the new cable showed an increase of 35% over the same components of the best conventional cable and an increase of 43% over the average. Finally, in resistance to separation of the insulated conductors, the inventive cable showed an increase of 72.5% over the best and an increase of 334% over the average.

What is most significant is that none of the seven conventional cables tested equalled the inventive cable in any of the aforementioned properties. Moreover, if one took the best ratings of these conventional cables for each of these properties to construct a hypothetical cable, it would have an overall rating of only 71% of the inventive cable; the latter therefore exhibiting an increase in overall rating of 41% over such a hypothetical cable. As a matter of fact, the actual conventional cable having the highest overall rating of those tested was only 59.7% as good as the inventive cable. Accordingly, the cable comprising the invention represents an actual increase of 67.7% in overall rating over the best conventional cable tested.

The term "lay" as used herein means the amount of advance of any point in a strand for one complete turn. While the particular cable shown and described above is a two-conductor cable having a ground conductor, it is to be understood that the same principles of construction that characterize the new cable are equally well adapted to cables having no ground conductor as well as more than two insulated conductors. In addition, the new cable has been described above with reference to various rubber or rubber-like, insulating materials as being preferred for the conductor insulation, the tapes and the jacket. However, mechanically strong and durable cables may be made in accordance with the invention using other materials such as pliable resinous and plastic compounds (vinyl polymers and polyethylene polymers, for example) for these components. Furthermore, it is to be understood that various other modifications and changes may be made by those skilled in the art within the principles of the invention, the scope of which is to be determined by the appended claims.

Having thus described my invention, what I claim and desire to protect by Letters Patent is:

1. An electric cable comprising an assembly of insulated conductors and a ground conductor positioned therebetween, each insulated conductor comprising a core of substantially straight and parallel fibrous strands, a plurality of substantially complete layers of metallic strands wrapped around said core in substantially parallel relationship, a serving comprising a plurality of fibrous strands wrapped around said metallic strands in substantially parallel relationship and an insulating cover deposited from latex surrounding said serving, a first fibrous tape impregnated and coated on its outer surface with an insulating material having adhesive properties spirally wrapped around each of said insulated conductors, a second fibrous tape impregnated with an insulating material spirally wrapped around said ground conductor without bonding to the insulating material in said first tape to permit the ground conductor to move slightly relative to said insulated conductors, and a jacket of the same insulating material as in said first fibrous tape enclosing said assembly, said jacket being integrally bonded to the outer surface only of said first fibrous tape to anchor said insulated conductors in substantially parallel relationship with each other and said ground conductor.

2. An electric cable comprising an assembly of insulated conductors and a ground conductor positioned therebetween, each insulated conductor comprising a core of substantially straight and parallel fibrous strands, a plurality of substantially complete layers of metallic strands wrapped around said core in substantially parallel relationship, a serving comprising a plurality of fibrous strands wrapped around said metallic strands in substantially parallel relationship and an insulating cover deposited from latex surrounding said serving, a first fibrous tape impregnated and coated with polychloroprene spirally wrapped around each of said insulated conductors without forming a bond therebetween, a second fibrous tape impregnated with an insulating material spirally wrapped around said ground conductor without bonding to the polychloroprene in said first tape to permit the ground conductor to move slightly relative to said insulated conductors, an open fibrous braid surrounding and holding the assembled insulated and ground conductors together, and an insulating jacket of polychloroprene enclosing said assembly, said jacket being integrally bonded to said first fibrous tape to anchor said insulated conductors in substantially parallel relationship with each other and said ground conductor, said first fibrous tape, while preventing movement of said insulated conductors relative thereto, being readily removable therefrom to facilitate stripping of said insulated conductors.

References Cited in the file of this patent

UNITED STATES PATENTS

| Number | Name | Date |
|---|---|---|
| 1,852,127 | Palmer | Apr. 5, 1932 |
| 2,235,523 | Hull | Mar. 18, 1941 |
| 2,455,773 | Johnson | Dec. 7, 1948 |
| 2,536,885 | Olson | Jan. 2, 1951 |
| 2,544,233 | Kennedy | Mar. 6, 1951 |
| 2,689,268 | Peck | Sept. 14, 1954 |
| 2,691,694 | Young | Oct. 12, 1954 |